(12) United States Patent
Shen et al.

(10) Patent No.: US 12,706,451 B2
(45) **Date of Patent: *Aug. 11, 2026**

(54) HYBRID CIRCUIT BREAKER USING A TRANSIENT COMMUTATION CURRENT INJECTOR CIRCUIT

(71) Applicants: Zheng John Shen, Chicago, IL (US); Yuanfeng Zhou, Chicago, IL (US)

(72) Inventors: Zheng John Shen, Chicago, IL (US); Yuanfeng Zhou, Chicago, IL (US)

(73) Assignee: ILLINOIS INSTITUTE OF TECHNOLOGY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/779,554

(22) Filed: Jul. 22, 2024

(65) Prior Publication Data

US 2025/0023340 A1 Jan. 16, 2025

Related U.S. Application Data

(63) Continuation of application No. 17/293,554, filed as application No. PCT/US2019/034901 on May 31, 2019, now Pat. No. 12,074,426.

(Continued)

(51) Int. Cl.
*H02H 3/087* (2006.01)
*H02H 1/00* (2006.01)

(52) U.S. Cl.
CPC .......... *H02H 3/087* (2013.01); *H02H 1/0007* (2013.01)

(58) Field of Classification Search
CPC ...... H02H 3/087; H02H 1/0007; H02H 3/021; H01H 2009/543; H01H 9/542; H01H 33/596
See application file for complete search history.

(56) References Cited

U.S. PATENT DOCUMENTS 4,805,062 A * 2/1989 Shirouzu .............. H01H 33/596 361/13
8,138,440 B2 3/2012 Onufriyenko et al.

(Continued)

FOREIGN PATENT DOCUMENTS

CN 105 917 431 A 8/2016
DE 3734989 A1 * 4/1988 ........... H01H 33/596

(Continued)

OTHER PUBLICATIONS

Callavik, et al., "ABB's hybrid HVDC breaker: an innovative breakthrough enabling reliable HVDC grids," ABB Review, Feb. 2013 (13 pages).

(Continued)

*Primary Examiner* — Monica Lewis
*Assistant Examiner* — Nicolas Bellido
(74) *Attorney, Agent, or Firm* — Pauley Erickson & Swanson

(57) ABSTRACT

A circuit breaker and method of operation. The circuit breaker includes a first current path including a mechanical switch, such as an ultrafast mechanical switch, and a second current path in parallel connection to the first current path, and including a current injector, such as a transient commutation current injection circuit, in series with bidirectional power electronic switch. A short circuit fault current from a mechanical switch path is communicated to the electronic path via a current injection, followed by interrupting the fault current. A pulse current is generated to the electronic switch in the second current path, and the mechanical switch is opened during the pulse current. The pulse current and the electronic switch reduce or eliminate arcing upon the opening the mechanical switch.

20 Claims, 7 Drawing Sheets

Related U.S. Application Data

(60) Provisional application No. 62/760,200, filed on Nov. 13, 2018.

(56) References Cited

U.S. PATENT DOCUMENTS

| | | | | |
|---|---|---|---|---|
| 8,503,138 | B2 | 8/2013 | Demetriades et al. | |
| 8,717,716 | B2 | 5/2014 | Häfner et al. | |
| 8,891,209 | B2 * | 11/2014 | Hafner | H01H 9/541 361/13 |
| 9,547,044 | B2 | 1/2017 | Klapper et al. | |
| 11,862,416 | B2 * | 1/2024 | Leusenkamp | H01H 9/542 |
| 12,074,426 | B2 * | 8/2024 | Shen | H02H 3/021 |
| 2008/0143462 | A1 | 6/2008 | Belisle et al. | |
| 2012/0014032 | A1 | 1/2012 | De Natale et al. | |
| 2015/0116881 | A1 | 4/2015 | Burnett et al. | |
| 2015/0280421 | A1 * | 10/2015 | Niwa | H01H 33/596 361/91.1 |
| 2019/0327807 | A1 * | 10/2019 | Sauerlander | H05B 45/3725 |
| 2020/0014190 | A1 * | 1/2020 | Wen | H01H 9/547 |
| 2020/0403396 | A1 | 12/2020 | Chen | |
| 2022/0006281 | A1 | 1/2022 | Shen et al. | |
| 2022/0246375 | A1 | 8/2022 | Leusenkamp | |

FOREIGN PATENT DOCUMENTS

| | | | | |
|---|---|---|---|---|
| JP | 2014235834 | A * | 12/2014 | |
| WO | WO-2015185096 | A1 * | 12/2015 | H01H 33/143 |
| WO | WO 2016/208968 | A1 | 12/2016 | |

OTHER PUBLICATIONS

Suzuki, A., et al., “HVDC Circuit Breakers Combining Mechanical Switches and a Multilevel PWM Converter: Verification by Downscaled Models,” IEEE Transactions on Power Electronics, Aug. 5, 2019, vol. 34, No. 5 (11 pps).

Georgia Tech, Florida State Univ.& ARPA-E,“EDISON—Efficient DC Interrupter with Surge Protection,” ECCE Conference presentation, Oct. 2, 2019 (17 pages).

* cited by examiner

HYBRID CIRCUIT BREAKER USING A TRANSIENT COMMUTATION CURRENT INJECTOR CIRCUIT

CROSS REFERENCE TO RELATED APPLICATION

This application is a continuation of U.S. patent application Ser. No. 17/293,554, which is a National Phase entry of PCT International Patent Application PCT/US2019/034901, filed on 31 May 2019, which claims the benefit of U.S. Application Ser. No. 62/760,200, filed on 13 Nov. 2018. The application is hereby incorporated by reference herein in its entirety and is made a part hereof, including but not limited to those portions which specifically appear hereinafter.

BACKGROUND OF THE INVENTION

This invention relates generally to circuit protection devices in power distribution or transmission systems DC power systems such as MVDC (1,000V to 100,000V) or HVDC (100,000V to 1,000,000V) are gaining tractions in recent years since they offer higher efficiency and power capacity. However, protecting these DC power systems from short circuit faults remains a major technical challenge. Traditional electromechanical circuit breakers are incapable of reliably interrupting a DC fault current because of lack of zero crossings in DC power. As illustrated in FIG. 1, a current solution uses a series auxiliary commutation power electronic switch in the main current conduction path under normal operation, but this leads to significant power losses and self-heating. The present invention is directed to overcoming this type of fundamental drawback.

SUMMARY OF THE INVENTION

A general object of the invention is to provide a hybrid circuit breaker that can quickly communicate a short circuit fault current from a mechanical switch branch to an electronic branch, and then interrupt the fault current without arcs.

The general object of the invention can be attained, at least in part, through a circuit breaker including a first current path including a mechanical switch, and a second current path in parallel connection to the first current path. The second current path includes a current injector in series with an electronic switch. The first current path desirably does not include any electronic switch in series with the mechanical switch.

In embodiments of this invention, the mechanical switch is or includes an ultrafast mechanical switch and/or the electronic switch is or includes a bidirectional power electronic switch. The current injector can be a transient commutation current injection circuit.

In embodiments of this invention, the circuit breaker includes a current sensor, wherein upon sensor detection of an overcurrent condition the current injector generates a pulse current. The mechanical switch opens when the current injector commutates the load current from the first current path to the second current path.

In embodiments of this invention, a varistor is in parallel connection to the second current path, wherein the varistor activates upon the electronic switch turning off. The varistor can be downstream of the current injector and in parallel connection to the electronic switch.

The circuit breaker can include, or be used with, any suitable control system or circuit to activate the current injector upon a detected overcurrent condition in the first current path. The current condition can be monitored by current, voltage, and/or temperature sensors. Upon activation the current injector generates a current, desirably a regulated pulse current, to commutate the load current from the first current path to the second current path.

The circuit breaker of embodiments of this invention can include a power converter. The power converter can include an auxiliary DC power supply in combination with a capacitor.

The invention further includes a method of DC circuit protection, such as using any of the circuit breaker embodiments described above. The method includes communicating a short circuit fault current from a mechanical switch branch to an electronic branch via a current injection and then interrupting the fault current. During normal operating conditions a load current from a source flows to a load through the mechanical current branch/path and not the electronic current branch/path.

In embodiments of this invention, the method includes: providing a mechanical switch in a first current path and an electronic switch in a second current path in parallel connection to the first current path; detecting an overcurrent condition in the first current path; generating a pulse current to the electronic switch in the second current path; and opening the mechanical switch during the pulse current. The pulse current can be substantially equal to a load current and/or a mechanical switch current of the first current path. The pulse current and the electronic switch desirably reduce or eliminate arcing upon the opening the mechanical switch. The electronic switch is closed or otherwise turned off upon the opening the mechanical switch.

Other objects and advantages will be apparent to those skilled in the art from the following detailed description taken in conjunction with the appended claims and drawings.

DESCRIPTION OF THE INVENTION

Figure 1:
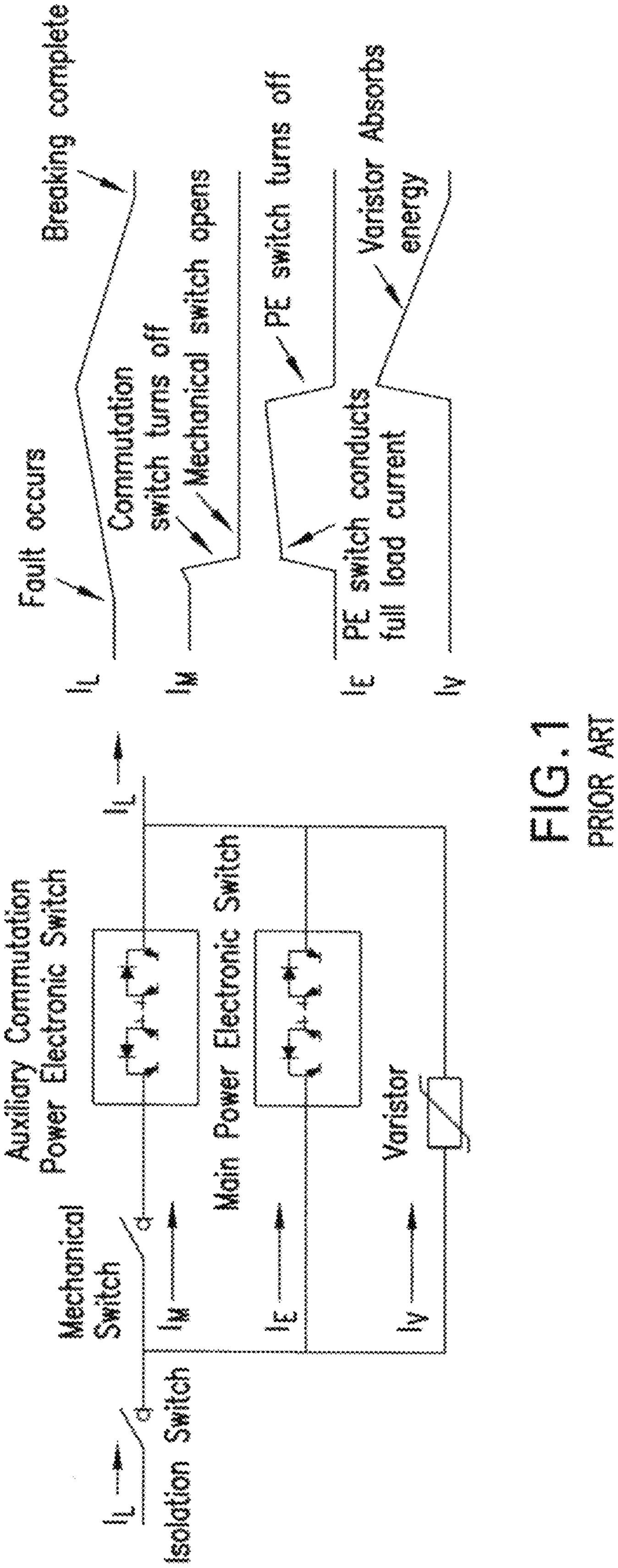
FIG. 1 is a schematic of a known circuit breaker.

The invention includes a circuit breaker device which detects and interrupts a fault current in power distribution or transmission systems to isolate the circuit fault from the rest of the system. The device and method of this invention can be particularly useful in DC power systems such as HVDC grids, solar or wind power systems, battery energy storage systems (BESS), EV charging infrastructures, public transportation, ships, and submarine power systems.

Embodiments of this invention include two parallel current paths: the mechanical path and the power electronic path. Referring to the circuit breaker 20 of FIG. 2, the mechanical path 30 includes an ultrafast mechanical switch 32. The parallel electronic path 40 includes a main power electronic switch 42. Under normal operating condition the load current flow from the source (left of isolation switch 22) to the load (right) through the ultrafast mechanical switch 32. Note that there is preferably no electronic switch in the mechanical path 30, which greatly reduces the large power loss associated with the auxiliary solid state commutation switch used in the prior art described above (which typically has 10-100× resistance than the mechanical switch).

Figure 2:
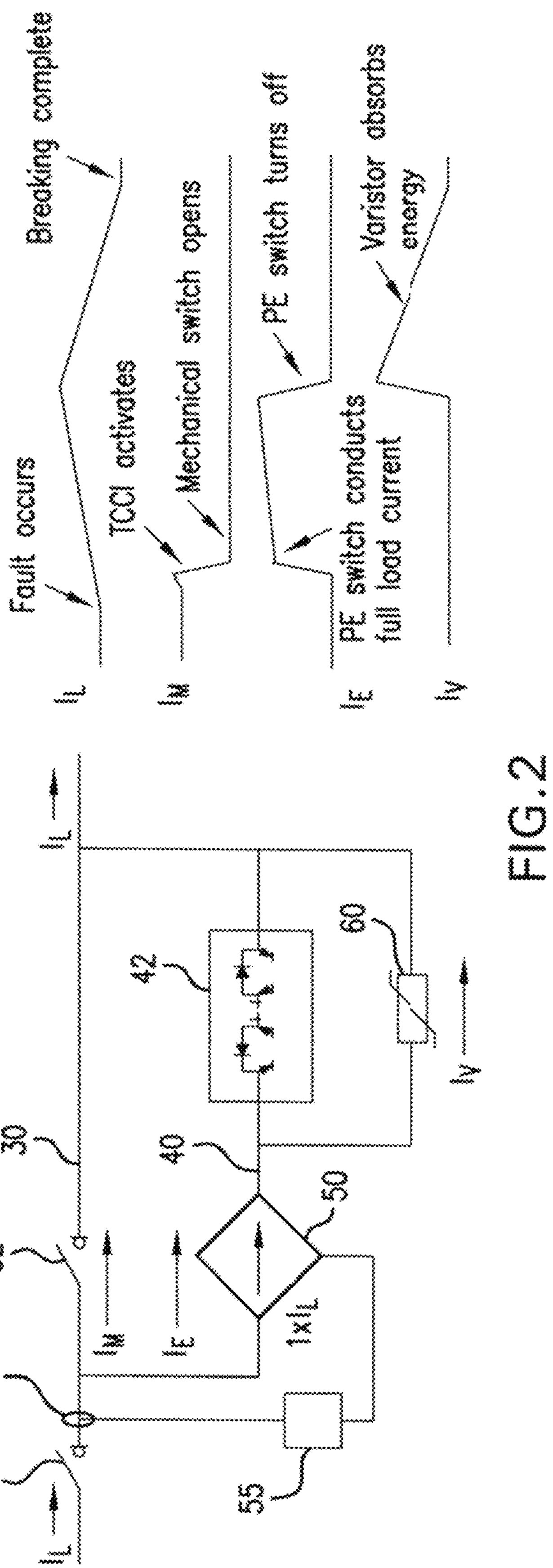
FIG. 2 is a schematic of a hybrid circuit breaker according to one embodiment of this invention.

As shown in FIG. 2, the electronic path 40 includes a current injector 50 in series with the electronic switch 42. For example, the electronic path of embodiments of this invention has a bidirectional power electronic switch (such as an IGBT or diode) and a power electronic transient commutation current injector (TCCI) circuit in series, and does not conduct load current under normal operation due to a much higher resistance. When a current sensor 54 detects an overcurrent condition, a control system or circuit 55 activates the TCCI 50 to generate, for example, a pulse current within tens of microseconds that is equal to the load current (and the mechanical switch current). Now the electronic path 40 conducts 100% of the load (fault) current, and the mechanical switch 32 can open with very little or no arc at all. After a short time period (e.g., several hundreds of microseconds), the main power electronic switch 42 turns off, forcing a varistor 60 in parallel to activate and absorb the residual electromagnetic energy in the circuit loop. The breaking action is now complete.

Figure 5A:
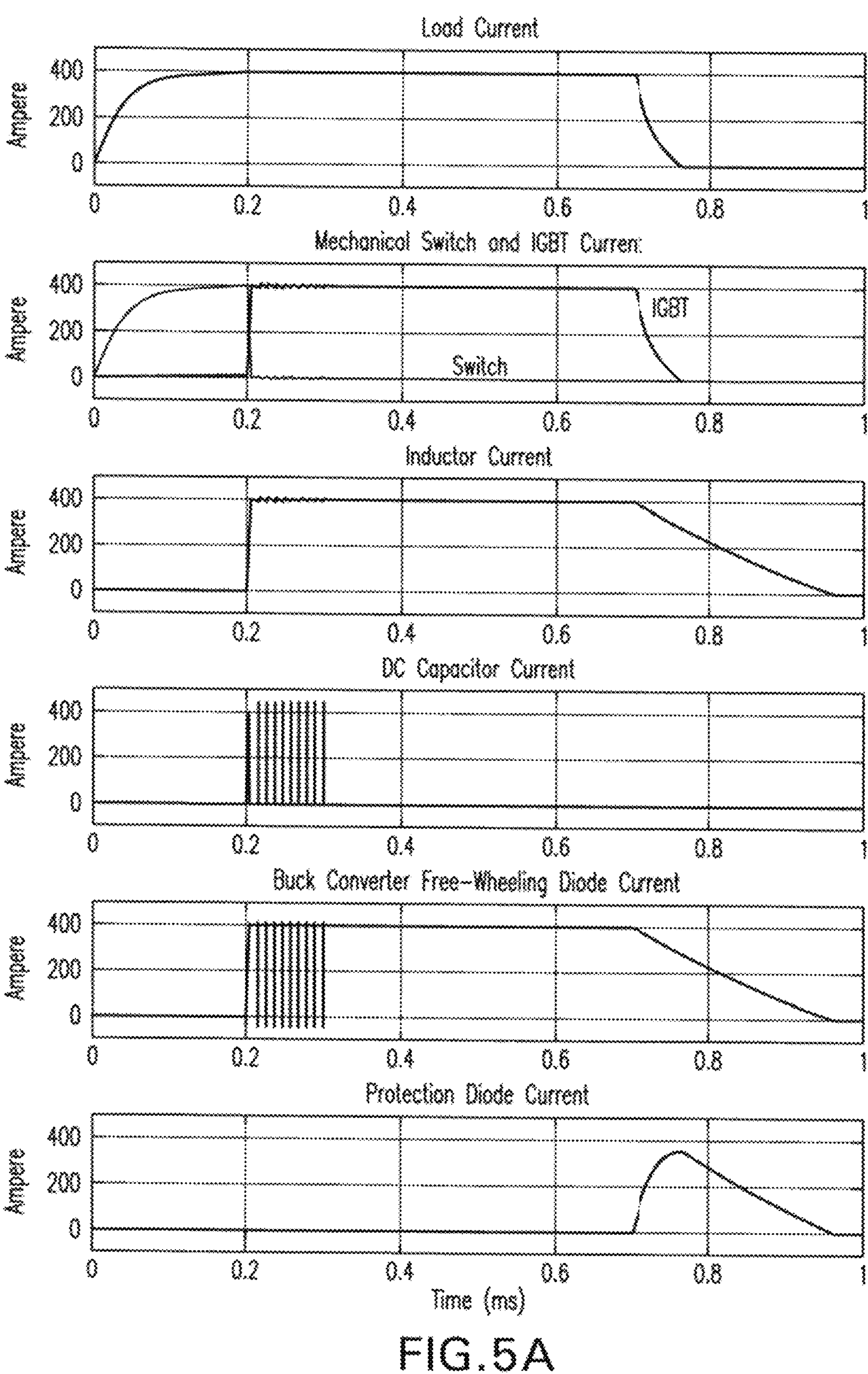
FIGS. 5A-C are each simulation waveforms, according to embodiments of this invention.
Figure 5B:
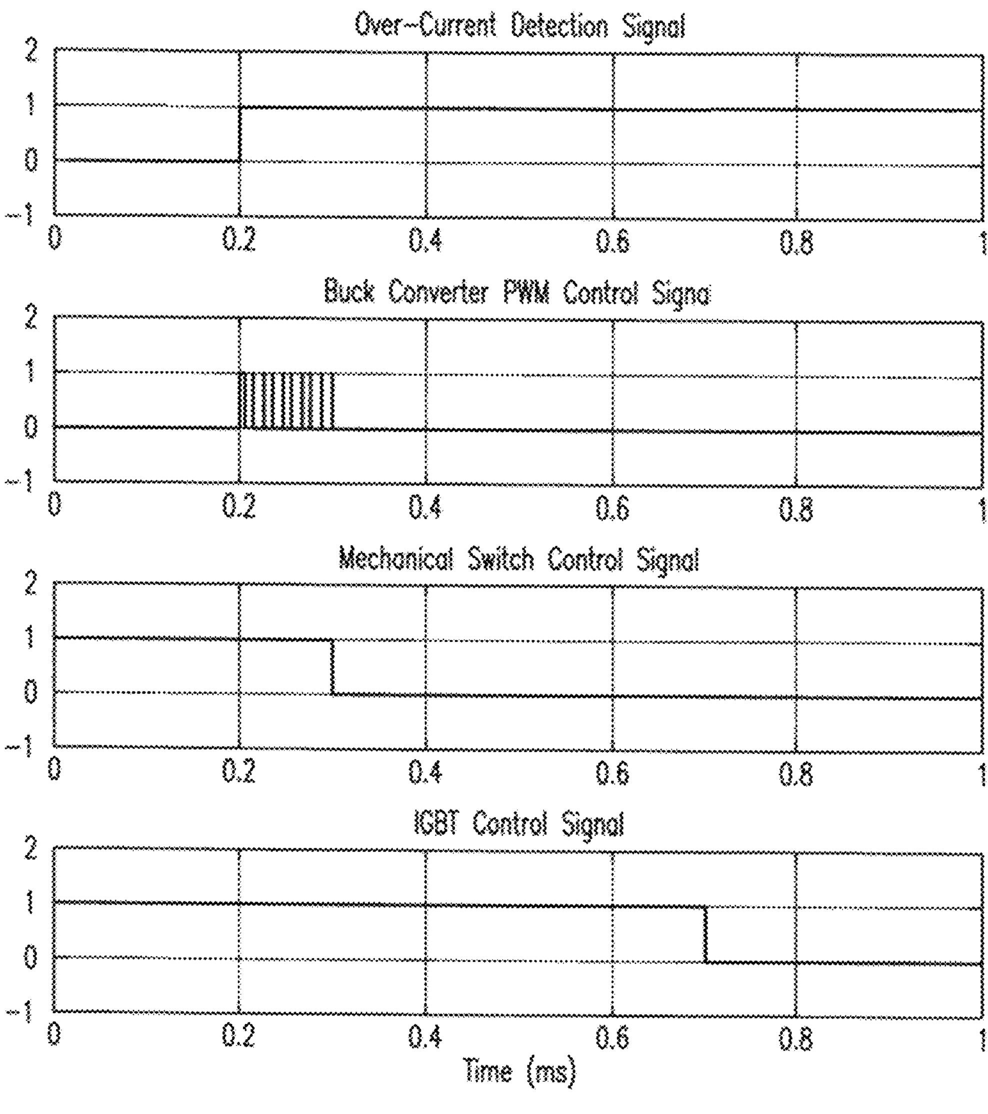
Figure 5C:
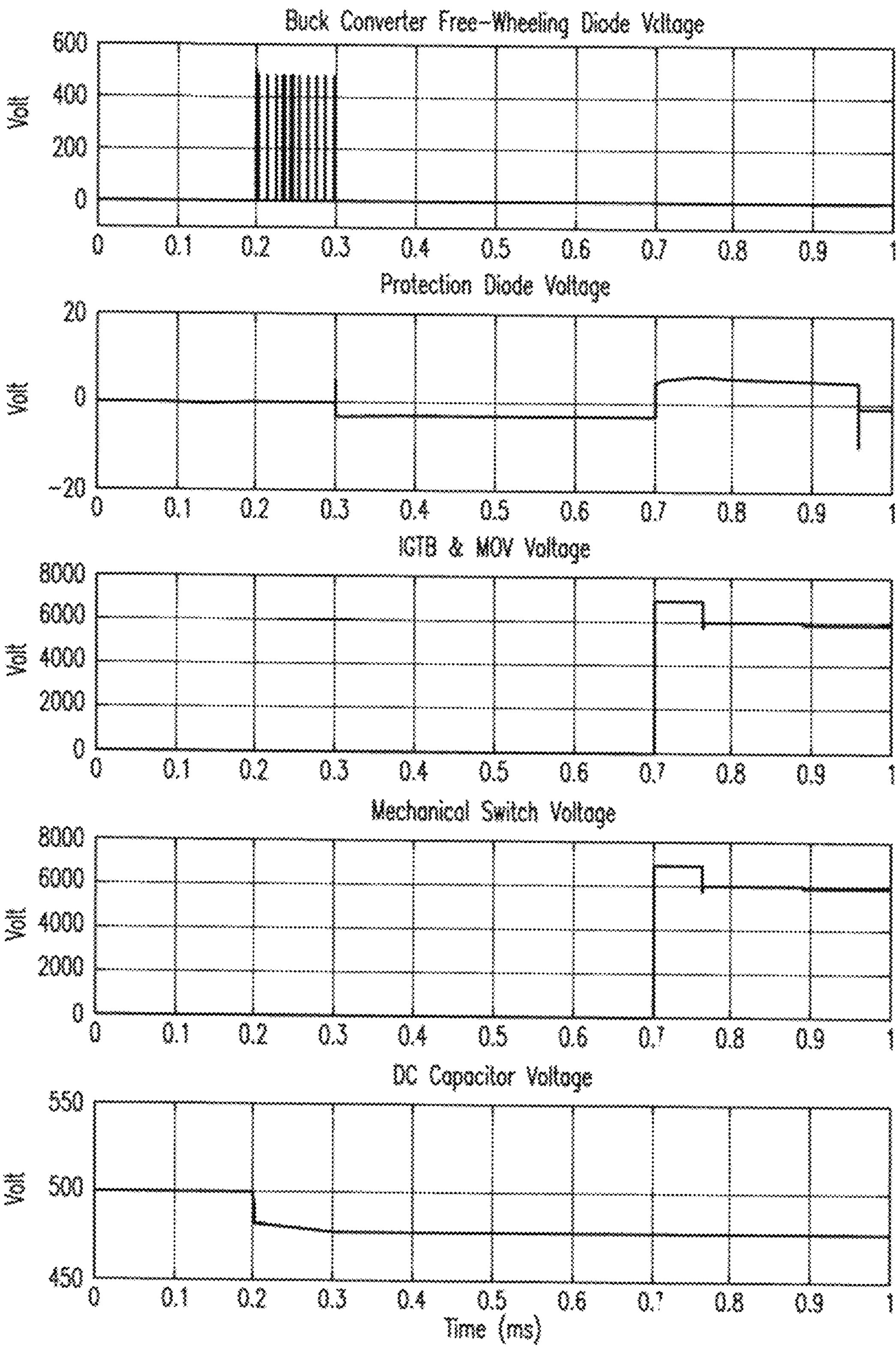

In embodiments of this invention, the TCCI circuit desirably does not operate at all under normal condition, resulting in no power losses. Once called into action by a control circuit, it quickly generates a switch-mode pulse current to commutate the load current from the mechanical branch into the electronic branch. A current mode control method can be used to match its current exactly to the load current. The TCCI only operates for a very short time period (e.g., <200 microseconds, desirably <100 microseconds), and then allows the load current flow freely through itself once the commutation between the mechanical and electronic paths completes. Several exemplary designs of TCCI are shown here for illustration purpose. Computer simulation has been performed to verify the design, and simulation waveforms are also included in FIGS. 5A-C.

Figure 3A:
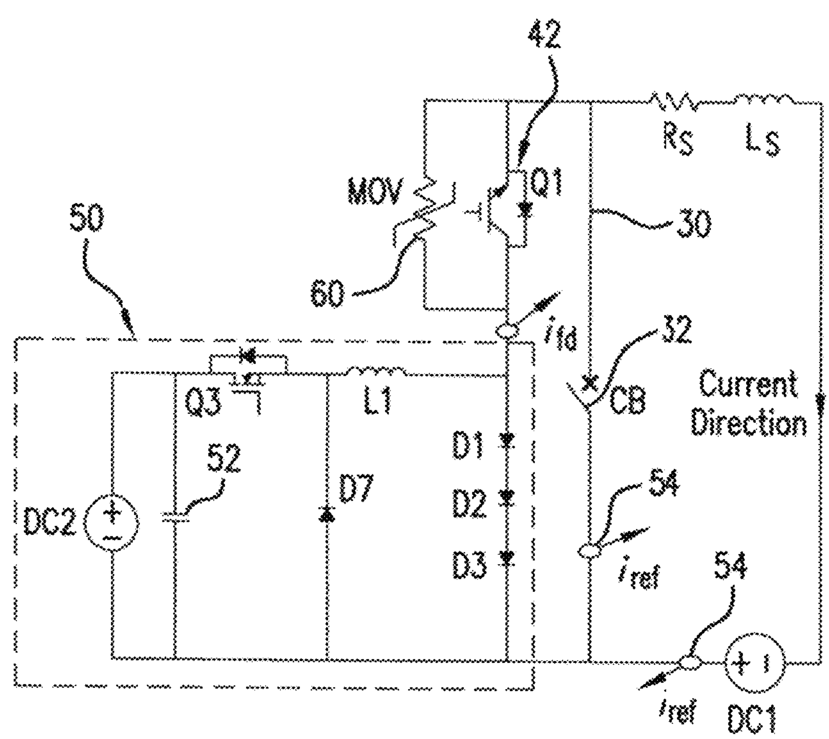
FIG. 3A is a schematic of a uni-directional current injector based on a buck converter topology, according to one embodiment of this invention.
Figure 3B:
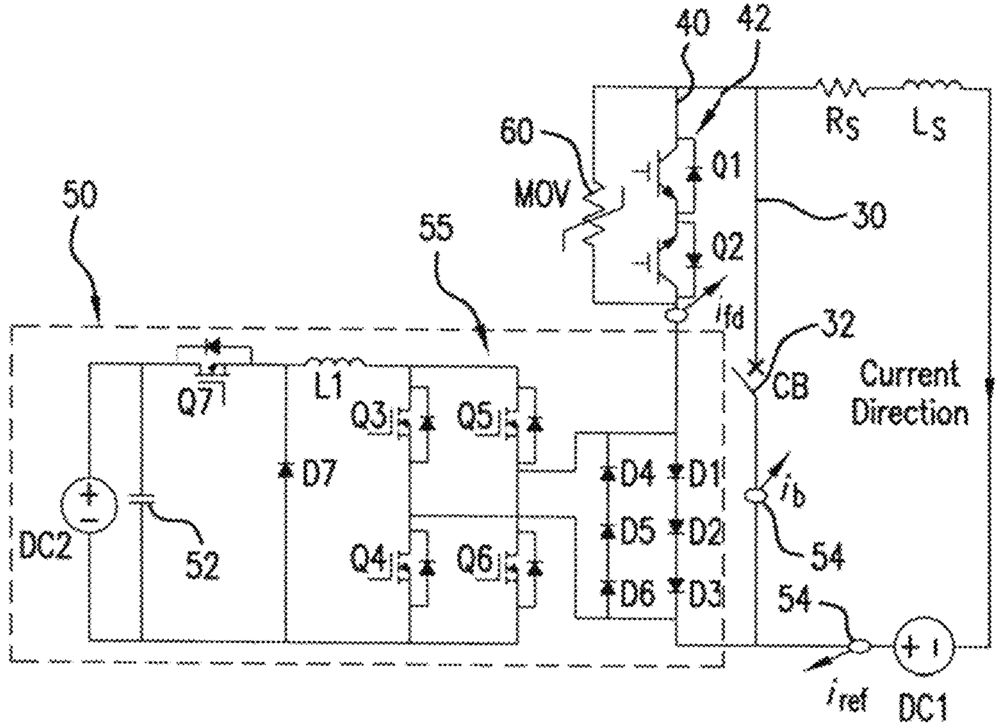
FIG. 3B is a schematic of a bi-directional current injector based on a buck converter topology, according to one embodiment of this invention.
Figure 4A:
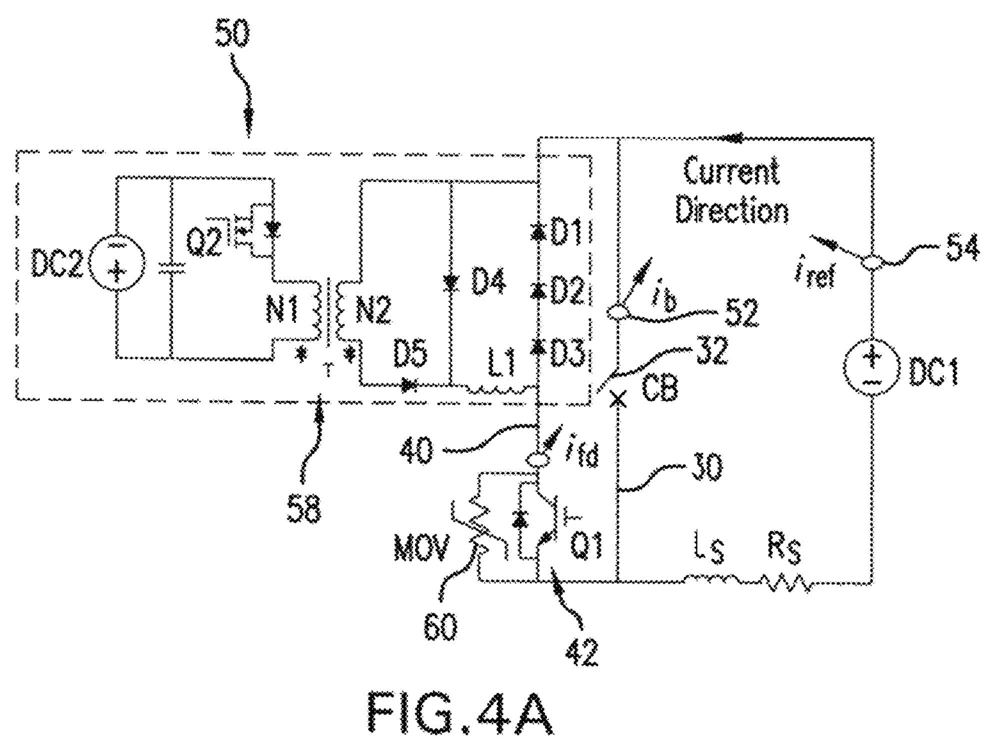
FIG. 4A is a schematic of a uni-directional current injector based on a forward converter topology, according to one embodiment of this invention.
Figure 4B:
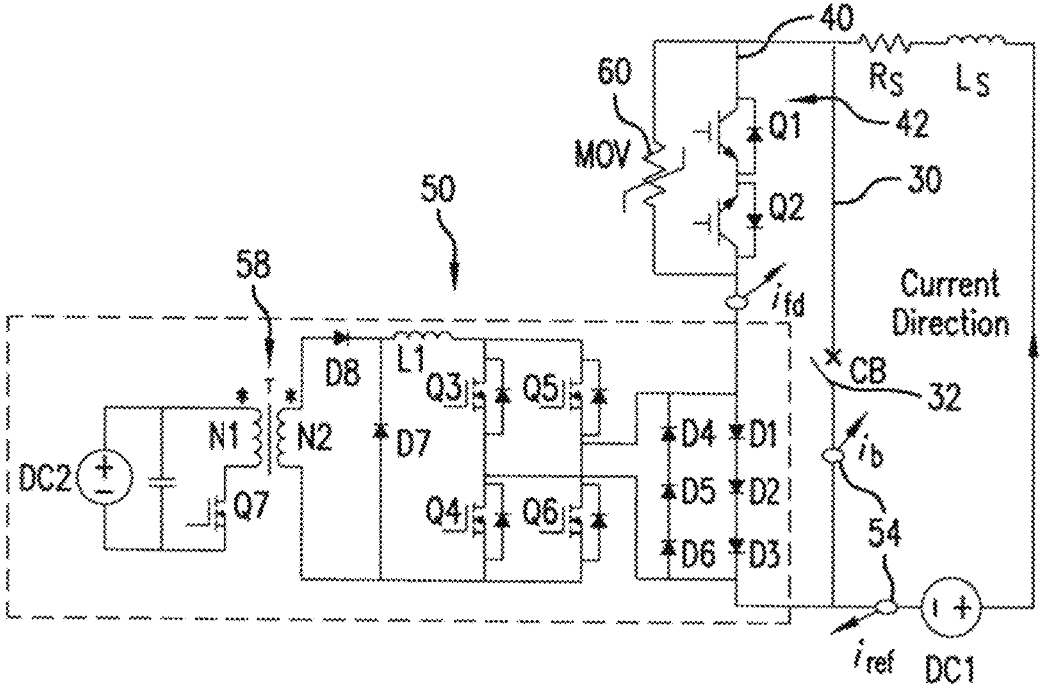
FIG. 4B is a schematic of a bi-directional current injector based on a forward converter topology, according to one embodiment of this invention.

FIG. 3A shows an embodiment of uni-directional TCCI 50, based on a buck converter formed among Q3, D7, and L1. An auxiliary offline DC power supply DC2 is used to charge a parallel capacitor 52. Upon receiving a commutation control signal, Q3 turns on to discharge the capacitor 52 through L1, and ramps up the current to approach the load (fault) current. Q3 turns off when the TCCI current reaches the load current, and remains in a PWM (bang-bang current control mode) to ensure precise tracking of the load current. FIG. 3B shows an embodiment of bi-directional TCCI 50 through a full-bridge 55. The TCCI 50 in FIGS. 4A-B are based on a forward converter through a transformer 58, and operate in a similar manner as the buck converter. Element reference numbers are conserved for like or similar components throughout the figures.

Thus, the invention provides a hybrid circuit breaker that can quickly communicate a short circuit fault current from a mechanical switch branch to an electronic branch, and then interrupt the fault current without arcs.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A circuit breaker, comprising:
- a first current path including a mechanical switch;
- a second current path in parallel connection to the first current path, the second current path including a current injector in series with an electronic switch, wherein, upon activation during an overcurrent condition in the first current path, the current injector generates a pulse current to the electronic switch.

2. The circuit breaker according to claim 1, wherein the mechanical switch comprises an ultrafast mechanical switch.

3. The circuit breaker according to claim 1, wherein the first current path does not include any electronic switch in series with the mechanical switch.

4. The circuit breaker according to claim 1, further comprising a current sensor configured to detect the overcurrent condition.

5. The circuit breaker according to claim 1, wherein the mechanical switch opens when the current injector commutates a load current from the first current path to the second current path.

6. The circuit breaker according to claim 1, further comprising a varistor in parallel connection to the second current path, wherein the varistor activates upon the electronic switch turning off.

7. The circuit breaker according to claim 1, further comprising a varistor downstream of the current injector and in parallel connection to the electronic switch.

8. The circuit breaker according to claim 1, further comprising a control circuit in combination with the current injector, to activate the current injector upon the overcurrent condition in the first current path.

9. The circuit breaker according to claim 8, wherein upon activation the current injector generates a regulated pulse current to commutate a load current from the first current path to the second current path.

10. The circuit breaker according to claim 8, wherein the current injector comprises a power converter.

11. The circuit breaker according to claim 10, wherein the power converter comprises an auxiliary DC power supply in combination with a capacitor.

12. The circuit breaker according to claim 1, wherein the pulse current is substantially equal to the load current.

13. The circuit breaker according to claim 1, wherein the pulse current comprises a switch-mode pulse current.

14. The circuit breaker according to claim 1, wherein the load current of the first current path flows freely through the current injector upon a commutation from the first current path to the second current path.

15. The circuit breaker according to claim 1, wherein the current injector is configured to operate in a bang-bang current control mode to provide the pulse current.

16. The circuit breaker according to claim 1, wherein upon activation during the detected overcurrent condition in the first current path, the current injector generates a plurality of pulse currents to the electronic switch.

17. A circuit breaker, comprising:

a first current path including a mechanical switch;

a second current path in parallel connection to the first current path, the second current path including a current injector in series with an electronic switch; and a control circuit in combination with the current injector, the control circuit is configured to activate the current injector upon a detected overcurrent condition in the first current path, wherein upon activation during the detected overcurrent condition the current injector generates a switch-mode pulse current and the mechanical switch opens when the switch-mode pulse current of the current injector commutates a load current from the first current path to the second current path.

18. The circuit breaker according to claim 17, wherein the switch-mode pulse current matches the load current.

19. The circuit breaker according to claim 17, wherein the switch-mode pulse current is equal to the load current.

20. The circuit breaker according to claim 17, wherein the electronic switch is downstream of the current injector, and further comprising a varistor downstream of the current injector and in parallel connection to the electronic switch.

* * * * *